US00RE49482E

(19) United States
(12) Reissued Patent
Motz et al.

(10) Patent Number: US RE49,482 E
(45) Date of Reissued Patent: Apr. 4, 2023

(54) EROSION-PREVENTING LAMINATE MAT AND ASSEMBLY SYSTEM

(71) Applicant: Motz Enterprises, Inc., Cincinnati, OH (US)

(72) Inventors: James G. Motz, Palacios, TX (US); Matthew J. Motz, Cincinnati, OH (US)

(73) Assignee: Motz Enterprises, Inc., Cincinnati, OH (US)

(21) Appl. No.: 17/130,907

(22) Filed: Dec. 22, 2020

Related U.S. Patent Documents

Reissue of:

(64) Patent No.: 10,161,094
Issued: Dec. 25, 2018
Appl. No.: 15/467,516
Filed: Mar. 23, 2017

U.S. Applications:

(60) Provisional application No. 62/312,979, filed on Mar. 24, 2016, provisional application No. 62/312,392, filed on Mar. 23, 2016.

(51) Int. Cl.
*E02D 17/20* (2006.01)
*E02B 3/12* (2006.01)

(52) U.S. Cl.
CPC ..... *E02B 3/126* (2013.01); *E02B 3/121* (2013.01); *E02B 3/125* (2013.01); *Y02A 10/11* (2018.01)

(58) Field of Classification Search
CPC . E02B 3/12; E02B 3/121; E02B 3/122; E02B 3/125; E02B 3/126; E02B 3/04;
(Continued)

(56) References Cited

U.S. PATENT DOCUMENTS 984,121 A * 2/1911 Condie ..... E02B 3/122 405/18
1,253,209 A * 1/1918 Chenoweth ..... E02B 3/121 405/18

(Continued)

FOREIGN PATENT DOCUMENTS

AU 2015100623 A4 6/2015
BE 830760 A * 10/1975 ..... E02B 3/126

(Continued)

OTHER PUBLICATIONS

Product Overview featuring "Fornit® 30/30", by Huesker Engineering with Geosynthetics, 1 page (at least as early as Apr. 17, 2018).

(Continued)

*Primary Examiner* — Patricia L Engie
(74) *Attorney, Agent, or Firm* — Thompson Hine LLP

(57) ABSTRACT

An erosion-preventing laminate mat may include a first layer of slivers of a natural material, a second layer of slivers of a synthetic material, and, in embodiments, a third layer of an open mesh. A system for utilizing the erosion-preventing laminate may include a movable frame having an upper surface shaped to pass beneath a substantially flat sheet of tied block mat, the frame including a spindle below the upper surface for supporting a roll of the first mat, the first mat including the first layer of slivers of a natural material, the second layer of slivers of a synthetic material, and the third layer of an open mesh. In embodiments, a system for forming the mat includes a movable frame shaped to pass beneath a substantially flat sheet of the tied block mat, and (Continued)

including a spindle below the upper surface for supporting a roll of the first mat.

34 Claims, 6 Drawing Sheets

(58) Field of Classification Search
CPC ..... E02D 17/20; E02D 17/202; E02D 17/205; E02D 17/207
See application file for complete search history.

(56) References Cited

U.S. PATENT DOCUMENTS

| | | | | | |
|---|---|---|---|---|---|
| 1,451,229 | A | | 4/1923 | Loudenslager | |
| 2,192,939 | A | * | 3/1940 | Slayter | A01G 20/00 71/64.11 |
| 3,332,187 | A | | 7/1967 | Arcari | |
| 3,477,108 | A | | 11/1969 | Stokes | |
| 3,597,928 | A | | 8/1971 | Pilaar | |
| 3,720,493 | A | | 3/1973 | Borcoman et al. | |
| 3,970,204 | A | | 7/1976 | Lutz | |
| 3,981,669 | A | | 9/1976 | Gambill et al. | |
| 4,311,273 | A | * | 1/1982 | Marsh | E01B 1/008 14/73 |
| 4,475,648 | A | | 10/1984 | Weeks | |
| 4,859,516 | A | | 8/1989 | Yamanaka et al. | |
| 5,039,250 | A | | 8/1991 | Janz | |
| 5,048,640 | A | | 9/1991 | McConville et al. | |
| 5,064,584 | A | | 11/1991 | Jefferies | |
| 5,082,397 | A | * | 1/1992 | Raviv | E02B 3/16 405/176 |
| 5,443,329 | A | | 8/1995 | de Geeter | |
| 5,501,753 | A | * | 3/1996 | Stark | B32B 7/02 156/292 |
| 5,554,393 | A | | 9/1996 | Uchida et al. | |
| 5,911,539 | A | * | 6/1999 | Egan | E02B 3/122 405/16 |
| 5,951,202 | A | * | 9/1999 | Brown | E02B 3/122 405/302.6 |
| 6,095,320 | A | | 8/2000 | DeMong et al. | |
| 6,517,294 | B2 | | 2/2003 | Vreeland | |
| 6,729,807 | B1 | * | 5/2004 | Spittle | E02D 17/202 428/221 |
| 6,793,858 | B2 | | 9/2004 | Motz | |
| 6,945,739 | B1 | | 9/2005 | Putman | |
| 7,634,877 | B2 | | 12/2009 | Wiercinski | |
| 8,365,467 | B1 | * | 2/2013 | Livingston | E02B 3/125 47/65.9 |
| 9,556,048 | B1 | * | 1/2017 | Owings | C02F 3/06 |
| 2001/0053310 | A1 | | 12/2001 | Brown | |
| 2002/0180076 | A1 | | 12/2002 | Motz | |
| 2009/0016826 | A1 | * | 1/2009 | Carpenter | E02D 17/202 405/302.6 |
| 2011/0042844 | A1 | | 2/2011 | Brown et al. | |
| 2012/0243949 | A1 | | 9/2012 | Schneider et al. | |
| 2013/0101354 | A1 | * | 4/2013 | Lignier | B09B 1/004 405/128.45 |
| 2013/0309012 | A1 | * | 11/2013 | Lancaster | E02B 3/04 405/21 |
| 2017/0081819 | A1 | * | 3/2017 | Nadeau | E02B 3/12 |
| 2019/0161922 | A1 | * | 5/2019 | Whitaker | E01C 21/00 |
| 2019/0202084 | A1 | | 7/2019 | Motz | |
| 2020/0391406 | A1 | | 12/2020 | Motz et al. | |

FOREIGN PATENT DOCUMENTS

| | | | | | |
|---|---|---|---|---|---|
| DE | 19629669 | A1 | * | 7/1997 | A01G 1/005 |
| EP | 0123737 | A1 | | 11/1984 | |
| EP | 0192861 | A1 | | 9/1986 | |
| FR | 2261873 | | * | 9/1975 | |
| FR | 2261873 | A1 | | 9/1975 | |
| GB | 2085949 | A | * | 5/1982 | E02B 3/126 |
| JP | 2-308061 | A | | 12/1990 | |
| KR | 20050019161 | | * | 3/2005 | |
| KR | 20050019161 | A | | 3/2005 | |
| KR | 2018061815 | A | * | 6/2018 | A01G 20/20 |
| WO | 2011/134476 | A1 | | 11/2011 | |
| WO | WO-2017094992 | A1 | * | 6/2017 | A01G 1/00 |

OTHER PUBLICATIONS

Product Overview featuring "High Performance Geosynthetics", by Enka® Solutions, 29 pages (Aug. 2016).
Webpage featuring "Recyclex® TRM and Recyclex® TRM-V," by American Excelsior Company, 11 pages, http://americanexcelsior.com/product/?sub=15 (retrieved from the internet on Aug. 25, 2015).
Australian Intellectual Property Office, Australian Patent Application No. 2017238225, Examination Report No. 1, 3 pages (dated Mar. 5, 2019).
Australian Intellectual Property Office, Australian Patent Application No. 2017238225, Notice of Acceptance, 3 pages (dated Jul. 2, 2019).
Australian Patent Office, Australian Patent Application No. 2017257882, Notice of Acceptance, 3 pages (dated Sep. 13, 2019).
Australian Patent Office, Australian Patent Application No. 2019204830, Examination Report No. 1, 5 pages (dated Aug. 7, 2020).
Canadian Intellectual Property Office, Canadian Patent Application No. 3018841, Examination Report, 4 pages (dated Mar. 29, 2019).
Canadian Intellectual Property Office, Canadian Patent Application No. 3018841, Examination Report, 5 pages (dated Oct. 18, 2019).
Canadian Intellectual Property Office, Canadian Patent Application No. 3014926, Notice of Allowance, 1 page (dated Jul. 8, 2019).
Canadian Intellectual Property Office, Canadian Patent Application No. 3014926, Office Action, 4 pages (dated Oct. 9, 2020).
Canadian Intellectual Property Office, Canadian Patent Application No. 3014926, Office Action, 4 pages (dated Mar. 31, 2020).
European Patent Office, European Patent Application No. 17753813.9, European Search Report and Opinion, 7 pages (dated Aug. 26, 2019).
European Patent Office, European Patent Application No. 17771110.8, Extended Search Report and Opinion, 7 pages (dated Aug. 29, 2019).
European Patent Office, European Patent Application No. 17771110.8, Intent to Grant, 7 pages (dated Jul. 6, 2020).
European Patent Office, European Patent Application No. 20157246.8, Search Report and Opinion, 11 pages (dated Jul. 17, 2020).
PCT, U.S. Patent and Trademark Office, International Application No. PCT/US2017/023710, International Search Report and Written Opinion, 13 pages (dated Jun. 16, 2017).
PCT, U.S. Patent and Trademark Office, International Application No. PCT/US2017/018122, International Search Report and Written Opinion, 12 pages (dated Jun. 19, 2017).
U.S. Patent and Trademark Office, U.S. Appl. No. 15/467,516, Advisory Action, 3 pages (dated Sep. 4, 2018).
U.S. Patent and Trademark Office, U.S. Appl. No. 15/467,516, Ex Parte Quayle Action, 4 pages (dated Sep. 13, 2018).
U.S. Patent and Trademark Office, U.S. Appl. No. 15/467,516, Final Office Action, 10 pages (dated May 11, 2018).
U.S. Patent and Trademark Office, U.S. Appl. No. 15/467,516, Non-Final Office Action, 15 pages (dated Jan. 12, 2018).
U.S. Patent and Trademark Office, U.S. Appl. No. 15/467,516, Notice of Allowance, 6 pages (dated Nov. 5, 2018).
U.S. Patent and Trademark Office, U.S. Appl. No. 15/048,539, Notice of Allowance, 8 pages (dated Nov. 15, 2018).
U.S. Patent and Trademark Office, U.S. Appl. No. 15/048,539, Office Action, 6 pages (dated Nov. 2, 2017).
U.S. Patent and Trademark Office, U.S. Appl. No. 15/048,539, Office Action, 9 pages (dated Jun. 26, 2018).
U.S. Patent and Trademark Office, U.S. Appl. No. 16/440,094, Final Office Action, 14 pages (dated Jan. 14, 2021).
U.S. Patent and Trademark Office, U.S. Appl. No. 16/440,094, Non-Final Office Action, 11 pages (dated Sep. 25, 2020).
U.S. Patent and Trademark Office, U.S. Appl. No. 16/277,540, Notice of Allowance, 7 pages (dated May 28, 2020).

(56) References Cited

OTHER PUBLICATIONS

U.S. Patent and Trademark Office, U.S. Appl. No. 16/277,540, Office Action, 9 pages (dated Jan. 9, 2020).
U.S. Patent and Trademark Office, U.S. Appl. No. 16/295,784, Non-Final Office Action, 14 pages (dated Apr. 15, 2021).
Australian Government—IP Australia, Examination Report No. 1 for Standard Patent Application, Australian Patent Application No. 2020201071,3 p. dated Nov. 1, 2021.
PCT, International Search Report and Written Opinion, International Application No. PCT/US2017/023710, 13 pages, dated Jun. 16, 2017.

* cited by examiner

EROSION-PREVENTING LAMINATE MAT AND ASSEMBLY SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue application of U.S. Pat. No. 10,161,094, which was filed as U.S. application Ser. No. 15/467,516 on Mar. 23, 2017 and issued on Dec. 25, 2018, and which claims priority from provisional application No. 62/312,392 filed on Mar. 23, 2016 and provisional application No. 62/312,979 filed on Mar. 24, 2016, the disclosures of each of which are hereby incorporated by reference in their entireties.*

TECHNICAL FIELD

The present disclosure relates to erosion-preventing mats and methods and systems for assembling erosion-preventing mats, and more particularly to flexible, erosion-preventing laminate mats and methods and systems for forming flexible, erosion-preventing laminate mats.

BACKGROUND

Erosion is a natural process in which meteorological elements such as rain, wind, and snow remove soil, rock, and dissolved material from one location on the Earth's crust, and transport it to another location. While erosion may be a natural process, human activity has increased the rate of erosion in specific locations many times the rate at which erosion would occur in such areas naturally. For example, land surfaces adjacent man-made structures, such as the banks of canals, land adjacent roads, and artificially created drainage channels and other waterways are particularly susceptible to erosion because naturally occurring indigenous vegetation is removed in order to form the canal bank, road, or drainage channel.

The erosion resulting from the construction of such man-made structures can be mitigated by remediation of the land surfaces adjacent the canal, road, or waterway, such as by planting vegetation to replace the vegetation that was stripped away during their construction. However, there is a time interval between the planting of the replacement vegetation and the point at which the replacement vegetation is sufficiently developed to prevent further erosion of surface soil during which further erosion may occur.

Efforts have been made to retain the surface soil in place in these areas until such time as the replacement vegetation can mature to where the root structure of the replacement vegetation retains the surface soil in place. An example of such material is the flexible mat structure disclosed in U.S. Pat. No. 6,793,858 titled "Method and Apparatus for Forming a Flexible Mat Defined by Interconnected Concrete Panels," the entire contents of which are incorporated herein by reference. That patent discloses a flexible mat structure in the form of spaced, interconnected concrete panels or blocks held together by an open mesh of a polymeric material such as a geogrid. The flexible mat structure is made by depositing concrete in the mold cavities of a rotating drum and embedding in the concrete material the open mesh geogrid.

While the method is effective, there is a need to introduce additional efficiencies in the manufacture of such flexible mat structure. Further, there is a need to provide means to protect and promote the growth of the replacement vegetation beneath the erosion-prevention flexible mat structure. One particular need is to retain moisture beneath the flexible mat structure that will promote the growth of the replacement vegetation beneath the mat structure. Efforts have been made to place a second mat, made of wood shavings, beneath the flexible mat structure of tied concrete blocks. The second mat structure of wood shavings absorbs and retains moisture, thereby maintaining the surface soil beneath the mat in a moist condition that promotes the growth of replacement vegetation.

However, a disadvantage with that structure is that the wood shavings, an organic material, eventually decay and disintegrate, which may occur prior to the establishment of the replacement vegetation, during an interval when there is still a need for the moisture-retaining properties of the wood shavings. Further, as the wood shavings decay, they may break up to a size below which they together form the second mat that can be retained by the geogrid material of the tied concrete mat, and may be washed away by rain or blown away by wind. Accordingly, there is a need for an erosion-preventing laminate mat and installation system that maintains a moist surface soil condition for a longer period than prior structures.

SUMMARY

This disclosure is directed to an erosion-preventing laminate mat that possesses superior moisture-retention capabilities and durability over prior designs, and a system and method for efficiently assembling the mat. In one embodiment, an erosion-preventing laminate includes a first layer of slivers of a natural material and a second layer of slivers of a synthetic material. In other embodiments, the mat may include a third layer of an open mesh.

In another embodiment, a method for preventing erosion of a surface includes placing a first mat on the surface, the first mat including a first layer of slivers of a natural material, a second layer of slivers of a synthetic material, and a third layer of an open mesh. In further embodiments, the method includes placing a tied concrete block mat on top of the first mat.

This disclosure also includes a system for performing the method of preventing erosion of a surface. An embodiment of the system includes a movable frame having an upper surface shaped to pass beneath a substantially flat sheet of the tied concrete block mat in which the frame includes a spindle below the upper surface for supporting a roll of the first mat.

Another embodiment of the system takes the form of a method for preventing erosion of a surface. The method includes placing a substantially flat sheet of tied concrete block mat on a first surface, placing a roll of the first mat on a spindle of a frame, placing the frame on the first surface beneath the substantially tied flat sheet of the tied concrete block mat, such that a portion of the sheet of the tied concrete block mat passes over the upper surface, moving the frame relative to and beneath the flat sheet of the tied concrete block mat, and simultaneously paying out a sheet of the first mat from the roll of the first mat on the spindle between the rear wheels of the frame such that the first mat is beneath the flat sheet of the tied concrete block mat, forming a laminate of the tied concrete block mat and the first mat into a roll, and unrolling the laminate on the surface.

In yet another embodiment of the system, a method for forming an erosion-preventing mat includes placing a first layer of slivers of a natural material on a surface and placing a second layer of slivers of a synthetic material on top of the first layer to form the mat. In further embodiments the method includes placing a third layer of an open mesh on top of the second layer.

Other objects and advantages of the disclosed erosion-preventing laminate mat and installation system will be apparent from the following description, the accompanying drawings, and the appended claims.

DETAILED DESCRIPTION

Figure 1:
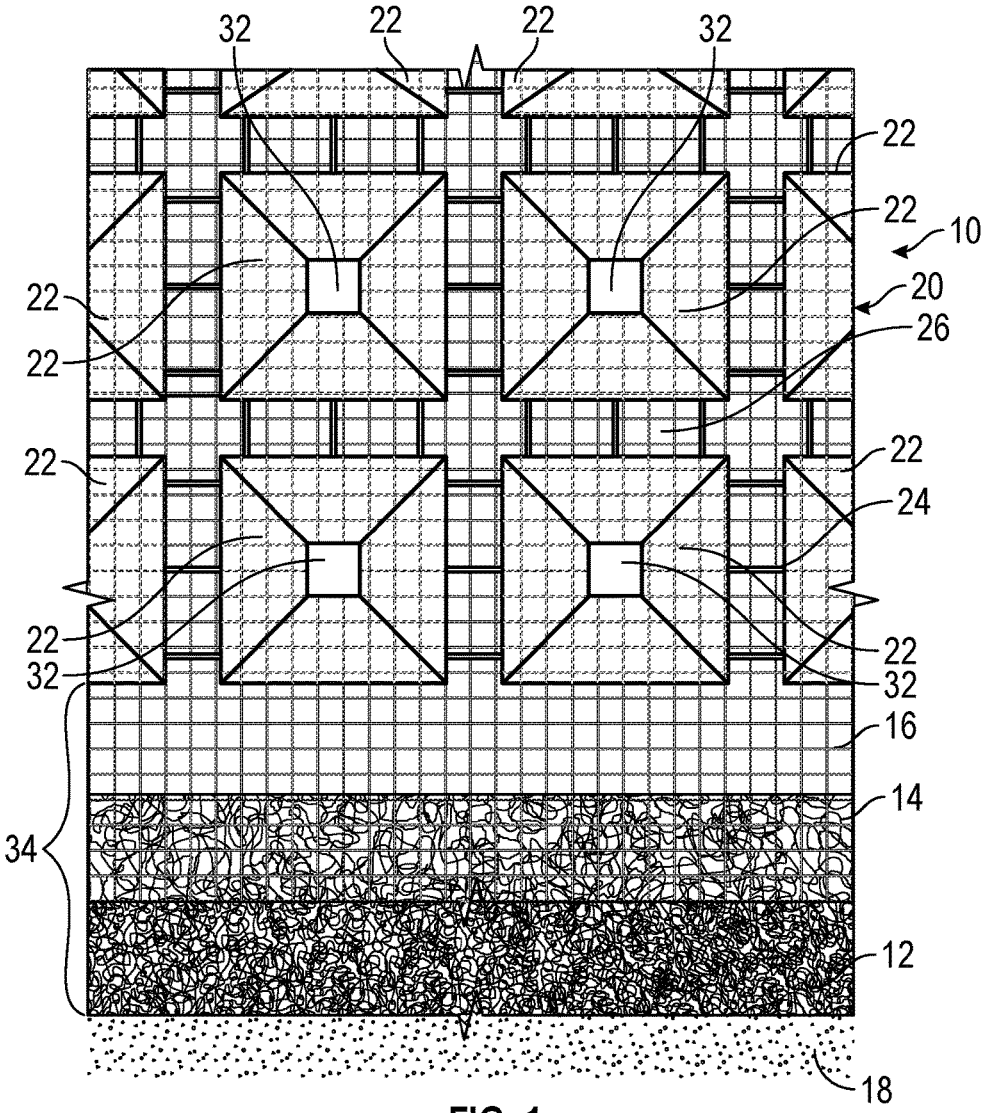
FIG. 1 is a top plan view of an embodiment of the disclosed erosion-preventing laminate mat.
Figure 2:
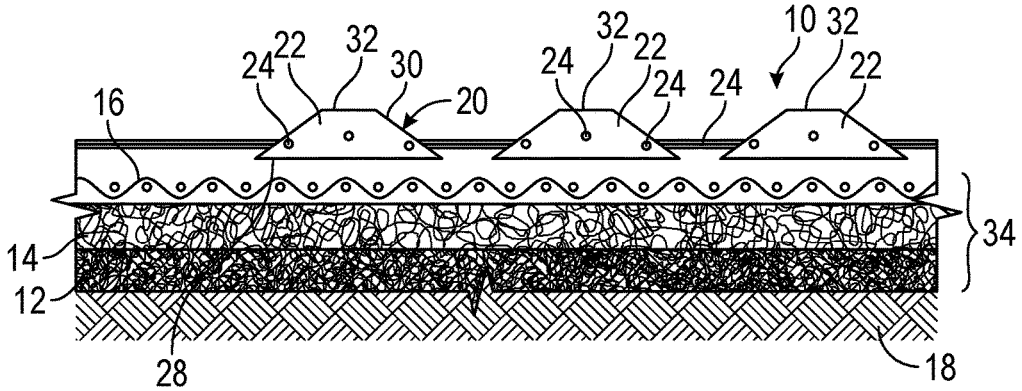
FIG. 2 is a side elevational view of the erosion-preventing laminate mat of FIG. 1.

As shown in FIGS. 1 and 2, an embodiment of the disclosed erosion-preventing laminate mat, generally designated 10, may include a first layer 12 of slivers or fibers of a natural (i.e., organic) material and a second layer 14 of slivers or fibers of a synthetic material. In further embodiments, the mat 10 may include a third layer 16 of an open mesh. The third layer 16 may be above the first layer 12 and the second layer 14, wherein the open mesh of the third layer maintains the first layer and the second layer in place when the mat 10 is placed on a surface 18, which in an embodiment may be the ground, such as a soil surface selected for erosion prevention. In further embodiments, the surface 18 may include seeds, such as grass seed or other vegetation ground cover, and/or germinated seeds, seedlings, and established and rooted plants, such as grass, including fescue.

In embodiments, the surface 18 may be any surface requiring an erosion-preventing laminate, such as a surface of the ground adjacent a road or roadbed, the bank of a canal, the bank of a channel or other natural or artificial waterway, a spillway as part of a drainage system, or ground surrounding or covering a landfill. In still other embodiments, the surface 18 may be any flat or substantially flat surface, such as earth, gravel, concrete, or asphalt, upon which the laminate mat 10 is assembled to be transported to a desired location for application to prevent soil erosion.

As shown in the figures, the first layer 12 of the mat 10 may be a lowermost layer that is placed upon and contacts the surface 18, such that the natural material of the first layer retains moisture immediately adjacent the surface 18; that is, there is no other object or material interposed between the first layer and the surface. Also as shown in FIGS. 1 and 2, the second layer 14 may be positioned between the third layer 16 and the first layer 12. In embodiments, the third layer 16 may be superposed to, and contacts the second layer 14, so that there is no other object or material interposed between the third layer and the second layer. Similarly, the second layer 14 may be superposed to, and contacts the first layer 12, so that there is no other object or material interposed between the second layer and the first layer. The synthetic material of the second layer 14, which resists degradation from sunlight and weathering for a longer period of time than the natural material of the first layer 12, operates to hold moisture adjacent the surface 18 after decomposition of the natural material of the first layer, at which point the second layer would contact the ground.

In an embodiment of the mat 10, the slivers of the first layer 12 and the slivers of the second layer 14 each may engage and tangle or intertwine with each other to form felt-like mats. In addition, the first layer 12 and second layer 14 engage and intermesh with each other at the interface of the first and second layers, which may provide a mechanical interlock between the two layers. Similarly, the open mesh of the third layer 16 may engage and interlock with the slivers of the second layer 14, which may provide a mechanical interlock between the two layers. In an embodiment, the open mesh third layer 16 may be bonded to the upper surface of the second layer 14 by a suitable adhesive. The open mesh third layer 16 may provide dimensional stability to the second layer 14, which may prevent distortion of the second layer and/or separation of fragments of the second layer from a remainder of the second layer. Such a dimensionally stable second layer 14 may impart dimensional stability to the first layer 12 by way of the mechanical interlock between the first and second layers.

The open mesh of the third layer 16 of the mat 10 may be a leno weave of synthetic material. For example, the open mesh of the third layer 16 may be a secondary carpet netting material, such as Action Back, manufactured by Carpet & Rug Backing (CRB) of Dalton, Ga. Also in embodiments, the natural material of the first layer 12 may be excelsior, also known as wood wool. Examples include Curlex CL Blankets by American Excelsior Co., Rice Lake, Wis. In other embodiments, the excelsior may be made of wood fibers or coconut shell fibers. The synthetic material of the second layer 14 may be plastic fibers. For example, the plastic fibers may be Recyclex TRM (Turf Reinforcement Mat), TRM-V recycled plastic fibers by the aforementioned American Excelsior Co.

Also shown in FIGS. 1 and 2, the laminate mat 10 may further include a fourth layer 20 of a tied block mat. The fourth layer 20 may be positioned vertically above and directly upon the third layer 16 (i.e., there is no other object or material interposed between the fourth layer and the third layer). The third layer 16 may be a mat positioned vertically above the second layer, and the second layer 14 may take the form of a mat positioned vertically above the first layer 12. With this arrangement, the fourth layer 20 may hold the first layer 12, the second layer 14, and the third layer 16 in a vertically stacked relation in place on and against the surface 18. The third layer 16, which may take the form of an open mesh of synthetic material, also may hold the first layer 12 of natural fibers and second layer 14 of synthetic fibers in place relative to each other, and on and against the surface 18 once the laminate mat 10 has been positioned at a desired location on the surface.

In an embodiment of the mat 10, the tied block mat of the fourth layer 20 may include a plurality of blocks 22 attached to and interconnected (i.e., tied together) by an open mesh, such as a geogrid 24. In embodiments, the blocks 22 may be formed of a hardenable material, such as cast concrete, cement, including hydraulic cement (e.g., Portland cement), cement mixed with gravel, sand, and/or other aggregate, a polymer, a clay, or a clay mixed with a polymer, and cast over the geogrid 24, so that the geogrid is embedded in the blocks 22. In other embodiments, the geogrid 24 may be attached to the blocks 22 by staples or by an adhesive.

The geogrid 24 may be made of a plastic material, such as polypropylene, including biaxial polypropylene yarn, which may or may not be coated with a polymer to provide additional ultra-violet (UV) resistance to degradation and rotting from weathering and sunlight. A suitable geogrid 24 is FORNIT® 30/30 biaxial geogrid, manufactured by HUESKER Synthetic GmbH of Gescher, Germany. The blocks 22 preferably are spaced from each other in a grid pattern to form gaps 26 around their peripheries sufficient to permit replacement vegetation to grow up from the surface 18 through the gaps between the blocks 22 and the geogrid 24.

Figure 5:
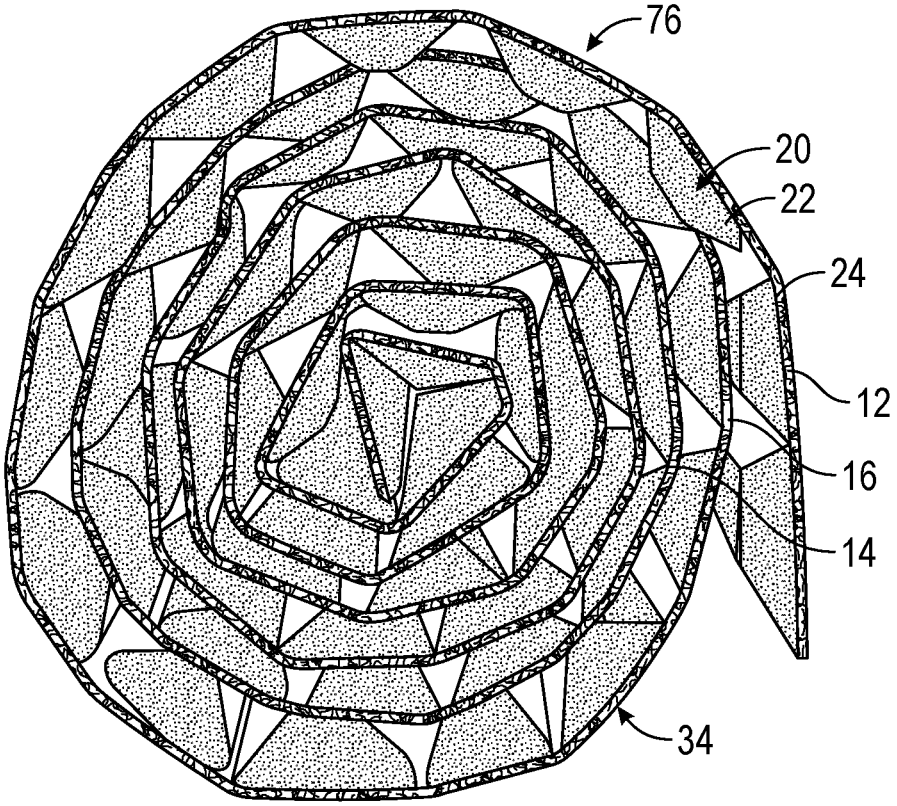
FIG. 5 is an end elevation of the erosion-preventing laminate mat of FIG. 1, formed into a roll.

In one particular embodiment, the blocks may have a dimension of about 6½" square at their bases, about 2½" high, and spaced about 1½" apart from each other. Also in a particular embodiment, the blocks 22 may have a truncated pyramidal shape, with substantially flat undersides 28 and four upwardly inclined and inwardly sloping upper sides 30 that may converge to a flat top 32. The pyramid shape formed by the sides 30 may facilitate the laminate 10 being formed into a roll, as shown in FIG. 5. In an embodiment, the weight of the blocks 22 may be sufficient to hold the first layer 12, the second layer 14, and the third layer 16 on top of each other and in place relative to each other and to the ground 18. A suitable mat 20 of the fourth layer is FLEXAMAT® tied concrete block mat, available from Motz Enterprises, Inc. of Cincinnati, Ohio.

A method for preventing erosion of the surface 18 may include placing a laminate mat 10 on the surface. This method may include placing a first mat 34 on the surface, the first mat including the first layer 12 of slivers of a natural material, a second layer 14 of slivers of a synthetic material, and a third layer 16 of the open mesh material, arranged as shown in FIG. 2. The first mat 34 may be placed on the surface 18 such that the first layer 12 of natural material is immediately adjacent and contacts the surface, the second layer 14 is immediately adjacent, contacts and in embodiments meshes with, and is on top of the first layer, and the third layer 16 is immediately adjacent, contacts and in embodiments meshes with, and is on top of the second layer. The mat 10 may be placed on the surface 18 by placing the layers 12, 14, 16 and tied concrete block mat 20 on the ground individually, thus building up the laminate mat upon the desired area of ground, or by forming the mat 10 at a first location, then transporting the mat to the desired location and placing it over the ground there.

With this arrangement, moisture may be retained by the first layer 12 of natural material, which may absorb moisture and maintain the surface 18 in a moist condition to facilitate the growth of replacement vegetation beneath the surface. The second layer 14 of synthetic fibers also may retain moisture, and may help the first layer 12 to retain moisture. As the first layer 12, which may be made of an organic material, decays and disintegrates, the second layer 14 may hold moisture against the surface 18, thereby continuing the function of the first layer in maintaining a moist surface area to promote growth of vegetation.

The second layer 14 may, depending upon its composition, last indefinitely, and in embodiments last longer (i.e., decay or disintegrate later) than the first layer 12, which may be sufficient to maintain the soil adjacent the surface 18 in a moist condition for the rapid growth of replacement vegetation on the surface beneath the mat 10, relative to erosion-preventing mats that lack one or both of the first and second layers 12, 14, respectively. The mesh 16 maintains the first and second layers 12, 14, respectively, in position and prevents individual fibers of the layers from being dispersed by the elements, such as wind, rain, flowing water, and foot traffic.

Also in the method, the tied block mat 20 may be placed on top of the first mat 34. The tied block mat 20 may further weigh upon, press down upon, and secure the first layer 12, second layer 14, and the third layer 16 in place above the surface 18. The blocks 22 may provide protection of the relatively soft material of the first mat 34. The blocks 22 may be prevented from moving relative to each other, the first mat 34, and the surface 18 by the geogrid material 24 that interconnects the blocks 22.

Figure 3:
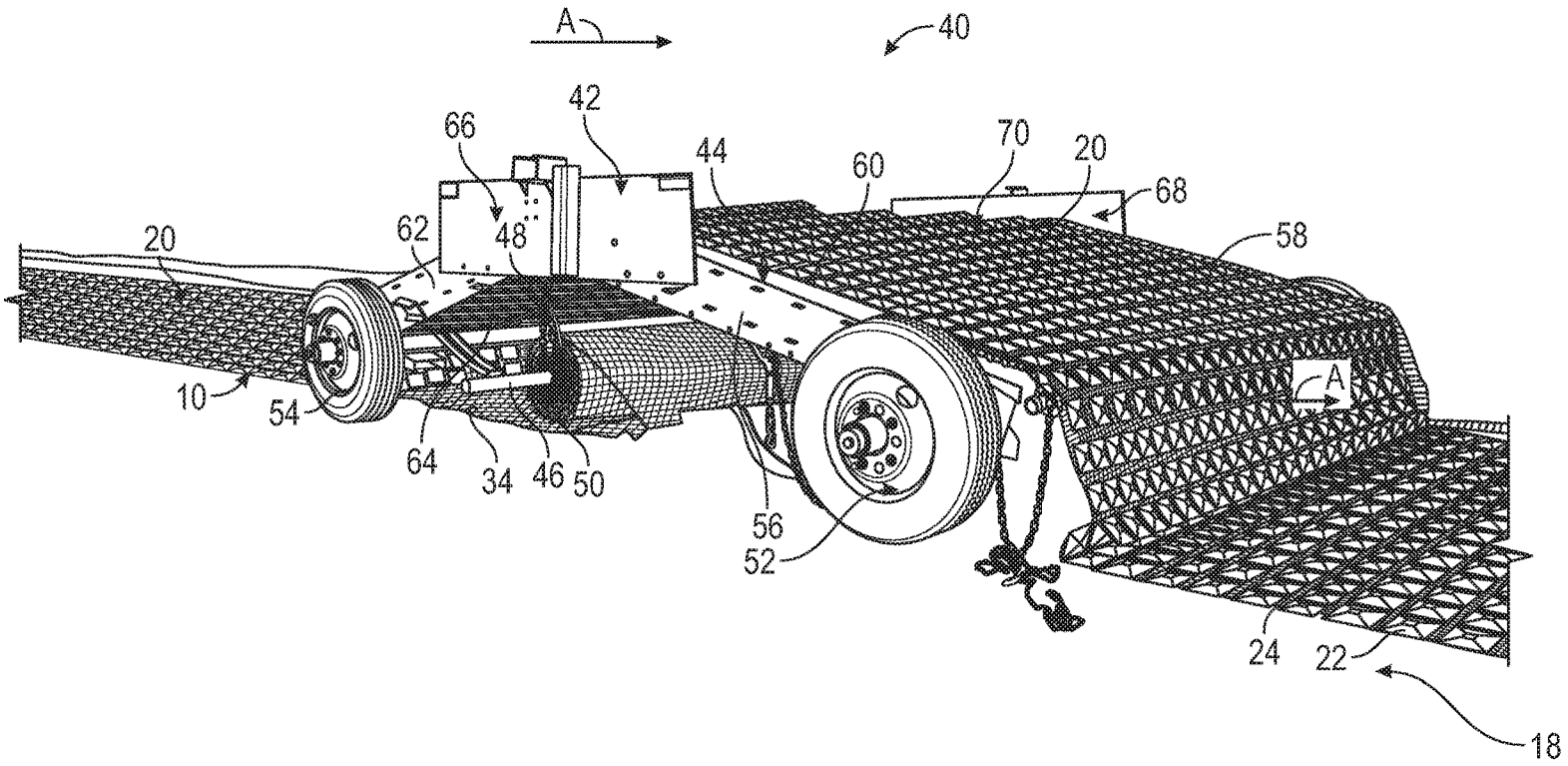
FIG. 3 is a perspective view of an embodiment of a system for assembling the erosion-preventing laminate mat of FIG. 1.
Figure 4:
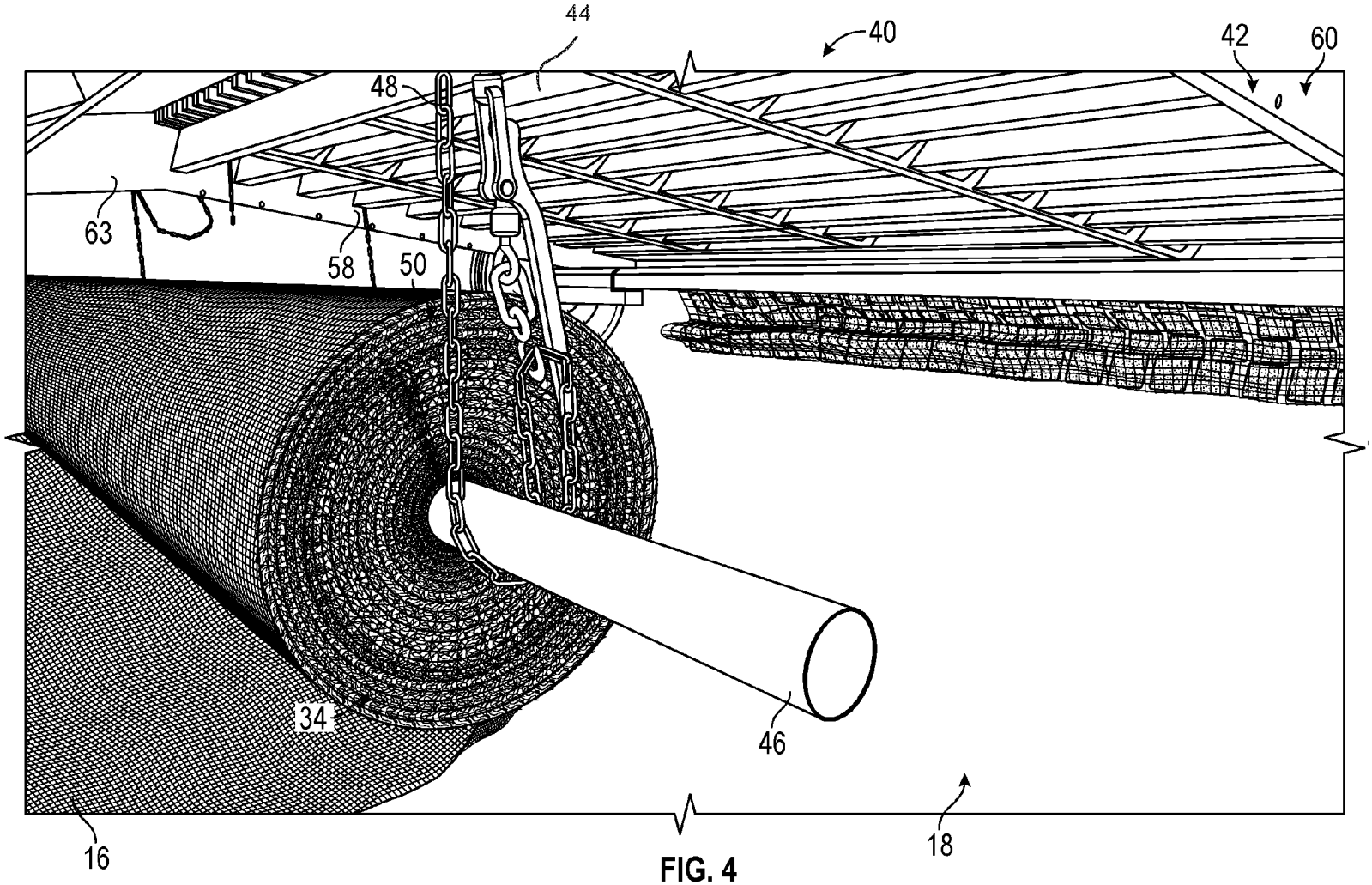
FIG. 4 is a detail of the system of FIG. 3.

As shown in FIGS. 3 and 4, a system for forming or assembling the mat 10 of FIGS. 1 and 2, generally designated 40, may include a moveable frame 42 having an upper surface, generally designated 44, which may be in the shape of a metal grid (see FIG. 4) shaped to pass beneath and support a segment of a substantially flat, elongate sheet of the tied block mat 20. The frame 42 also may include a spindle 46 that may be suspended from the underside of the upper surface 44 by a support strut 48, which may be rigid or flexible, such as adjustable straps or chains (shown) that may be looped around the outboard ends of, and hold the spindle. The spindle 46 may retain a roll 50 of the first mat 34 shown in FIGS. 1 and 2. The roll 50 may rotate relative to the spindle and/or the spindle rotates relative to the support strut 48. The frame 42 may include front and rear supports 52, 54, respectively, which may take the form of a front pair of wheels and a rear pair of wheels, respectively. Alternatively, the supports 52, 54 may take the form of front and/or rear pairs of skids or runners. As shown in FIG. 3, in an embodiment, the rear supports, in the form of a rear pair of wheels 54, may be spaced apart sufficiently to allow the first mat 34 to be payed out from the roll 50 on the spindle 46 between the rear pair of wheels 54.

The movable frame 42 may include a pair of front parallel support beams 56, 58 that support a substantially flat front component 60 of the upper surface 44. Similarly, the frame 40 may include a pair of rear parallel support beams 62, 63 that support a substantially flat rear component 64 of the upper surface 44. The front beams 56, 58 and rear beams 62, 63 may be joined by connecting plates 66, 68. In an embodiment, the metal grid comprising the upper surface 42 may be in two segments: a front segment comprising the front component 60 and a rear segment comprising the rear component 64. The support strut 48, which may be chains, may be suspended at the midpoint of the frame 42 between the front beams 56, 58 and rear beams 62, 63. As shown in FIG. 3, the front component 60 and rear component 64 each may be angled or inclined upwardly toward the middle of the frame, to meet at the highest point at the connecting plates 66, 68. This angled orientation facilitates the ability of the frame 42 to lift a segment of the elongated strip of tied block mat 20 over the spindle 46 as the frame moves along the strip of tied block mat.

Figure 6:
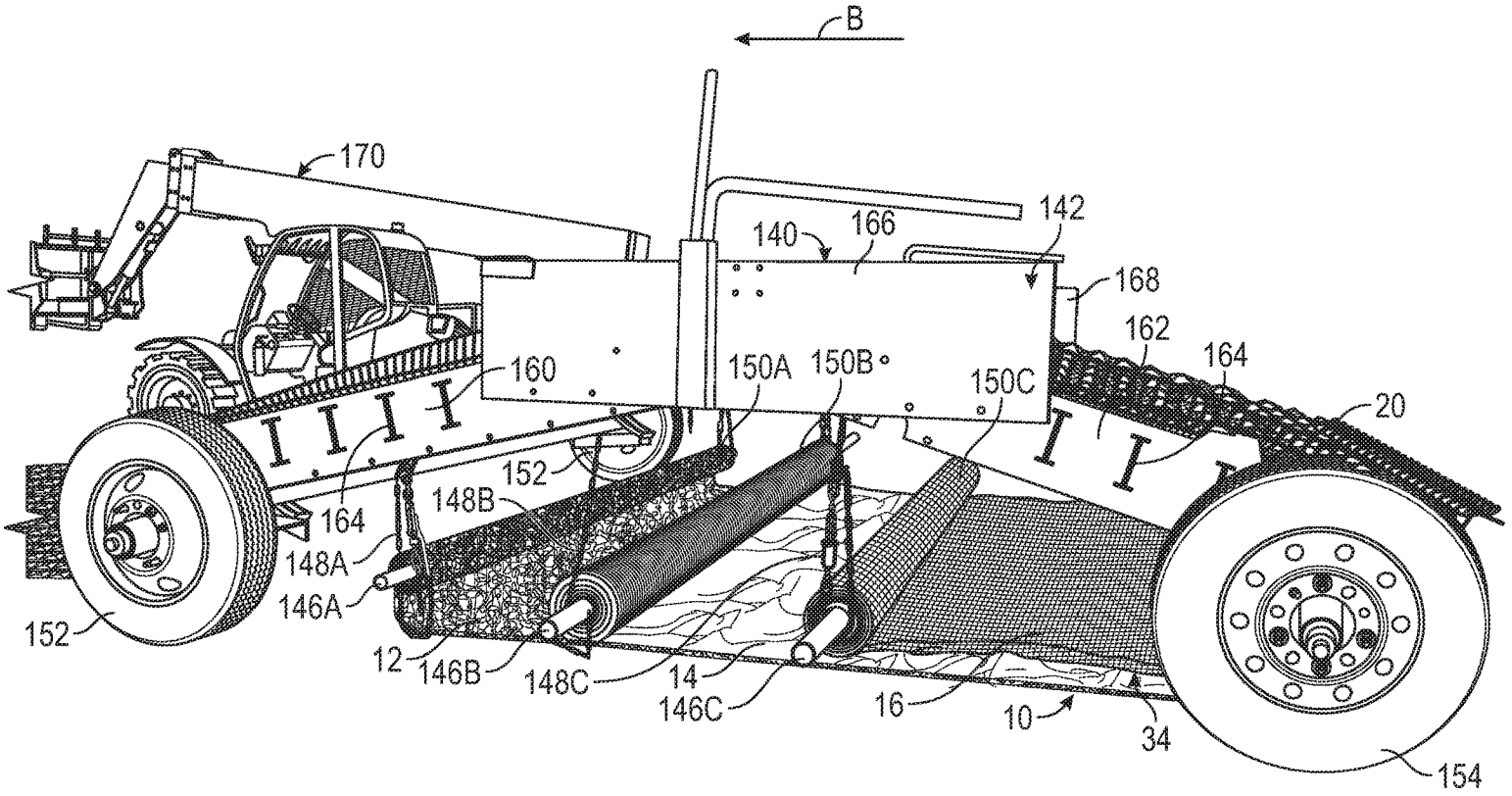
FIG. 6 is a perspective view of another embodiment of a system for assembling the erosion-preventing laminate mat of FIG. 1.

As shown in FIG. 6, a system 140 may include a frame 142 similar in construction to frame 42 of system 40 in FIGS. 3 and 4. The frame 142 may be supported by a front and rear supports, which may take the form of a front pair of wheels 152 and a rear pair of wheels 154, and/or alternatively front and rear skids or slides. The front pair of wheels 152 may be connected, in embodiments rigidly connected, to a traction device, such as a telehandler 170. The telehandler 170 may move or pull the frame 142 from right to left in FIG. 6, so that the frame moves beneath an elongate sheet of a tied block mat 20, such that the mat passes over the frame. In embodiments, the traction device 170 may be modified such that one of the front pair of wheels 152 is incorporated into the telehandler vehicle itself, and also serves as a wheel of the telehandler 170.

The frame 142 may include an upper surface in the form of spaced pairs of support beams, which may take the form of pairs of parallel side rails shown, which may be inclined side rails 160, 162 (only one of each is shown). The pairs of side rails 160, 162 each maybe attached to and support a plurality of transversely extending beams 164. The pairs of side rails 160, 162 may be connected by a pair of spaced-apart side panels 166, 168. In an embodiment, the pairs of side rails 160, 162 each may be inclined toward the center of the frame 142 forming an inverted chevron shape. The frame 142 may be placed under a continuous sheet of tied block mat 20, so that a segment of the tied block mat passes over the beams 164 of the pairs of side rails 160, 162. The frame 142 thus may be moved beneath the sheet of tied block mat 20 in order to place the mat 10 beneath it, as will be described. The side panels 166, 168 may contact the lateral edges of the tied block mat 20 passing over the frame 142 from front to rear to prevent the tied block mat from moving sidewardly off of the upper surface of the frame 142, and/or to contact the front and/or rear pairs of wheels 152, 154, respectively, as the frame moves beneath the sheet of tied block mat.

Spindles 146A, 146B, and 146C may be suspended by support struts 148A, 148B, and 148C, which may take the form of chains, respectively, from the underside of the upper surface of the frame 142. The support chains 148A-148C may be looped around the outboard ends of the spindles 146A-146C, respectively. In embodiments, the chains 148A, 148B, and 148C may be attached at upper ends thereof from the side rails 160, 162, the side panels 166, 168, and/or the transverse beams 164. Spindle 146A supports a roll 150A of the first layer 12 of slivers of natural material; spindle 146B supports a roll 150B of the second layer 14 of slivers of synthetic material; and spindle 146C supports a roll 150C of the third layer 16 of open mesh material. The rolls 150A-150C may rotate relative to their respective spindles 146A-146C, and/or the spindles rotate relative to their respective support struts 148A, 148B, and 148C. Thus, the frame 142 supports a plurality of spindles 146A-146C, each having a different one of the plurality of rolls 150A-150C of material mounted thereon. As shown in FIG. 6, the frame 142 may be moved right to left, so that the rolls 150A-150C unroll or pay out the layers 12, 14, 16 so that the first layer 12 is on the bottom, the second layer 14 is on top of the first layer, and the third layer 16 is on top of the second layer. All three layers 12, 14, 16, which form mat 10, will be beneath the sheet of the tied block mat 20 as the frame 142 moves along beneath the tied block mat. The resultant laminate mat 10, as shown in FIGS. 1 and 2, then may be rolled into the spiral or volute roll 76 shown in FIG. 5.

Figure 7:
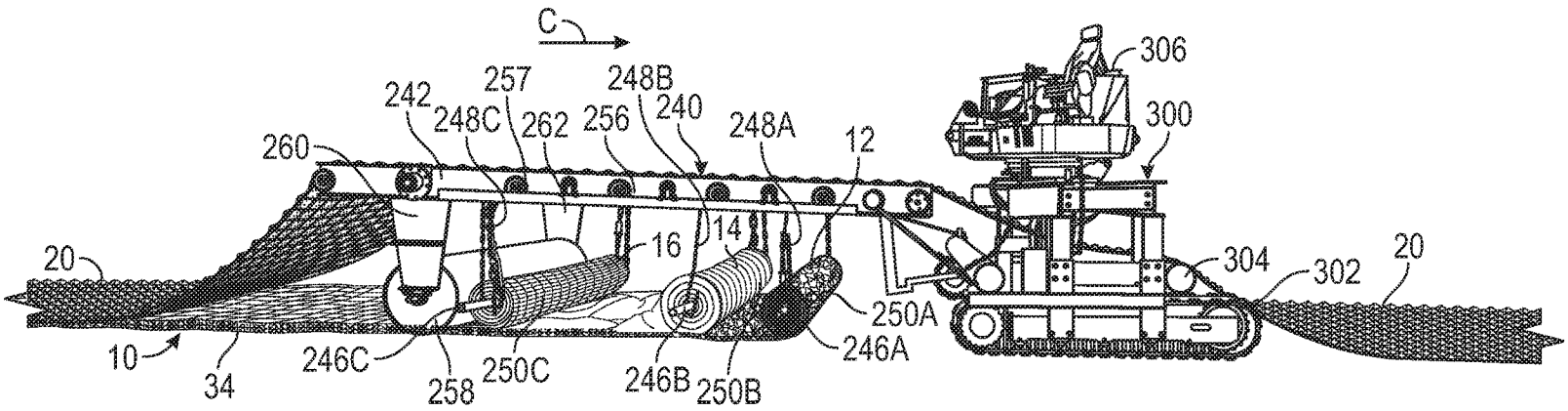
FIG. 7 is a perspective view of yet another embodiment of a system for assembling the erosion-preventing laminate mat of FIG. 1.

Similarly, FIG. 7 shows a system 240 that may include a frame 242 similar in construction to frame 42 of system 40 in FIGS. 3 and 4, except that it is self-propelled by a motorized, steerable tractor 300 with a pair of continuous tracks 302 spaced to straddle the mat 20 of tied block. The frame 242 may be supported at one end by the tractor 300 and includes an upper surface that includes a pair of spaced, substantially horizontal support beams 256 connected to each other by transverse rollers 257 spaced along the support beams. The rollers 257 may form the upper surface of the frame 242, and in embodiments one or more may be driven by a power take-off from the tractor 300.

The motorized tractor 300 also may include a transverse roller 304 over which the mat 20 passes as it passes between the tracks 302 and then over the rollers 257 of the frame 242. An operator cab 306 may be positioned above the mat 20 to provide an operator with an unobstructed view of the frame 242 and portion of mat to the rear of the frame. The rear of the frame 242 may be supported by a transverse roller 258 that is rotatably connected to struts 260, 262 that are attached to and extend downwardly from rearward portions of the support beams 256. The transverse roller 258 may take the form of a hollow drum, which may be made of a metal such as steel.

Spindles 246A, 246B, and 246C may be suspended by support struts 248A, 248B, and 248C, respectively, which may take the form of adjustable chains (shown) from beneath the undersides of the support beams 256 of the frame 242 and are looped around the outboard ends of the spindles. In embodiments, the support struts 248A, 248B, 248C, may be attached to the support beams 256 of the frame 242. Spindle 246A may support a roll 250A of the first layer 12 of slivers of natural material; spindle 246B may support a roll 250B of the second layer 14 of slivers of synthetic or artificial material; and spindle 246C may support a roll 250C of the third layer 16 of open mesh material.

As shown in FIG. 7, the tractor 300 may pull the frame 242 to move left to right in the direction of the arrow C, so that the rolls 250A-250C unroll or pay out the first, second, and third layers 12, 14, 16, respectively, so that the first layer 12 is on the bottom, the second layer 14 is directly on top of and contacts the first layer, and the third layer 16 is on directly top of and contacts the second layer. All three layers 12, 14, 16 may pass beneath the rear roller 258, which may compress them together, which may cause the layers to interlock. An advantage of using a support in the form of roller 258 is that the weight of the roller upon the mat 20 comprised of the layers 12, 14, 16 will not cause the mat to bunch up or become uneven. All three layers 12, 14, 16 will be beneath the sheet 20 of the tied concrete block mat as the frame 242 moves along beneath the mat 20. The resultant lamination 10, as shown in FIGS. 1 and 2, then may be rolled into the spiral or volute roll 76 shown in FIG. 5.

A method for preventing erosion of a surface, such as surface 18, with the laminate 10, using the system 40 may include placing a substantially flat sheet or strip of the tied block mat 20 on the surface 18, which in embodiments may be either the surface to be protected, or a substantially dry, flat surface at a location where the mat 10 is to be constructed. A roll 50 of the first mat 34 may be placed on the spindle 46 of the frame 42 below the upper surface 44 (see FIGS. 3 and 4). The frame 42 may be placed on the surface 18 beneath the sheet of the tied concrete block mat 20 such that a portion 70 of the sheet of the tied block mat 20 passes over the upper surface 44.

The frame 42 then may be moved relative to and beneath the flat sheet of the tied concrete block 20 (to the right in FIG. 3 in the direction of arrow A). The frame 42 may be connected to and moved by a telehandler 170 (FIG. 6) or other traction device or devices, or connected by the chains on either side of the frame 42 (only one side being shown) shown in FIG. 3 to a tractor or other traction device or devices and pulled. As the frame 42 moves beneath the sheet of tied concrete block material 20, the first mat 34 is payed out from the roll 50 in a rearward direction (that is, opposite the direction of arrow A) and passes between the rear wheels 54 and beneath the frame such that the first mat is placed beneath the flat sheet of tied concrete block mat 20. The leading edge of the first mat 34 may be fed into and held by the nip between the tied concrete block mat 20 and the ground 18 at the rear of the frame 42, and thereafter by the pressure of the tied concrete block mat pressing the first mat against the ground 18. The frame 42 continues moving in this fashion until the desired length of laminate mat 10, comprised of tied concrete block mat 20 over the first mat 34, is formed.

The process may be performed in a similar fashion for the system 140 of FIG. 6. The frame 142 may be positioned beneath the strip of tied block mat 20, which, except for the portion elevated by the frame, lies upon the ground 18. The telehandler 170 may move the frame 142 in the direction of arrow B beneath the strip of tied block mat 20, which passes over the beams 164 above the spindles 146A, 146B, and 146C as the frame passes beneath it. As the frame 142 moves, the roll of the first layer 12 of natural material pays out on, or is manually placed and held down upon, the ground beneath the frame. At the same time, the roll of the second layer 14 of synthetic material pays out upon, or is manually placed on and may be held upon, the first layer 12, and the roll of the third layer 16 of open mesh material pays out upon and may be held upon the second layer. As the frame 142 continues to move in the direction of arrow B, the portion of the strip of tied block mat 20 elevated by the frame 142 leaves the frame and lies on top of the first mat 34, made up of layers 12, 14, 16, forming the laminate 10 of FIGS. 1 and 2, and holds the first mat in place against the ground 18.

With the system 240 of FIG. 7, the tractor 300 may move the frame 242 from left to right in the direction of arrow C. Each of the layers 12, 14, 16 may be payed out from its own roll 250A, 250B, 250C, respectively, to form the three-layer first mat 34 that passes beneath roller 258. The first mat 34 may then pass beneath tied block mat 20 to form the laminate mat 10.

If the foregoing forming processes have been performed on the surface 18 of ground to be protected from erosion, the process is complete. If this surface 18 is remote from the surface to be protected, the composite laminate mat 10, made up of the tied concrete block mat 20 and first mat 34, may be formed into a roll 76, as shown in FIG. 5, and transported to the location where it is to be deployed. In one embodiment, the composite laminate 10, arranged in a continuous sheet, may by rolled up by machinery, such as a mini-excavator (not shown) to form the roll 76. The roll 76 may be loaded onto and secured to a truck bed (not shown), and the roll transported to the location where the laminate mat 10 is to be deployed. At that location, the roll 76 simply may be unloaded from the truck bed by a crane or telehandler, placed in position, and unrolled to form the composite mat 10 on the surface 18 to be protected. The process may be the same for the embodiments of FIGS. 6 and 7.

The function of the frames 42, 142, and 242 is to facilitate the arrangement of the layers 12, 14, 16 of the first mat 34 beneath the tied block mat 20. Another function of the frames 42, 142, 242 may be to perform a "debrittling" process in which excess hardenable material is removed from voids between the individual blocks 22 of the tied block mat 20. This debrittling process results from the tied block mat 20 being lifted up from the ground 18, and as it passes over the angled frames 42, 142, and 242, each transverse row of cast blocks 22 is bent at an angle relative to an immediately adjacent transverse rows of cast blocks.

This relative movement of rows of cast blocks 22 relative to each other may break or snap off brittle pieces of material that may project from the blocks 22, such as from the edges of the blocks, or that may bridge between adjacent blocks. This excess material may result from the mat forming process, in which blocks 22 of hardenable material are cast into the geogrid 24 (FIG. 1). In this regard, the frames 42, 142, 242 may be pushed, pulled, or in the case of the frame 242 in FIG. 7 driven, several times back and forth beneath the mat 20, so that excess hardenable material, such as concrete, falls downwardly through the frame and remains on the manufacturing bed or ground 18.

The foregoing laminate mat 10 possesses superior moisture retention capability and duration, and also presents superior resistance to degradation resulting from weather and meteorological events such as rain, wind, snow, and rushing water. The systems 40, 140, 240 for forming the mat 10 each provide an efficient and cost effective means for forming laminate mats 10 of any desired length.

While the forms of apparatus and methods disclosed herein constitute preferred embodiments of the erosion-preventing laminate mat and installation system, it is to be understood that the disclosure is not limited to these precise systems and methods, and that changes may be made therein without departing from the scope of the disclosure.

What is claimed is:

1. An erosion-preventing laminate mat comprising:

a first, [lowermost] *lower* layer [consisting] of slivers of a natural material, the slivers of natural material tangled with each other to form a first felt-like mat;

a second layer [consisting] of slivers of a synthetic material, the slivers of synthetic material tangled with each other to form a second felt-like mat;

wherein the second layer is [superposed to] *positioned above*, and contacts the first layer such that the slivers of the first layer and the slivers of the second layer engage and intermesh with each other at an interface of the first layer and the second layer to provide a mechanical interlock between the first layer and the second layer; and

[a third layer of] an open mesh[, wherein the third layer is] above the second layer such that the open mesh engages and interlocks with the slivers of the second layer to provide a mechanical interlock with the slivers of the second layer to maintain [the first layer and] the second layer in place[when the mat is placed on a surface].

2. The laminate mat of claim 1, wherein the synthetic material of the second layer continues to hold moisture adjacent the surface after decomposition of the first layer.

3. The laminate mat of claim 1, wherein the open mesh is a leno weave of synthetic material.

4. The laminate mat of claim 1, wherein the natural material is excelsior; and the synthetic material is a plastic.

5. The laminate mat of claim 4, wherein the excelsior is selected from wood fibers and coconut fibers.

6. The laminate mat of claim 1, further comprising a [fourth] *third* layer of a tied block mat.

7. The laminate mat of claim 6, wherein the [fourth] *third* layer is a tied block mat above the [third layer] *open mesh*; the [third layer] *open mesh* is above the second layer; and the second layer is above the first layer; wherein the [fourth] *third* layer holds the first layer, the second layer, and the [third layer] *open mesh* in place on the surface.

8. The laminate mat of claim 6, wherein the tied block mat includes a plurality of concrete blocks attached to and interconnected by a mesh.

9. The laminate mat of claim 8, wherein the concrete blocks are spaced from each other and the mesh is a geogrid.

10. The laminate mat of claim 9, wherein the concrete blocks are shaped to permit the laminate to be formed into a roll.

11. A method for preventing erosion of a surface, the method comprising:

placing *or forming* a first mat on the surface, the first mat including*:* a first layer [consisting] of slivers of a natural material, the slivers of natural material tangled with each other to form a first felt-like mat;

a second layer [consisting] of slivers of a synthetic material, the slivers of synthetic material tangled with each other to form a second felt-like mat, [and] *wherein* the second layer is superposed to the first layer such that the second layer contacts the first layer so that the slivers of the first layer and the slivers of the second layer engage and intermesh with each other at an interface of the first layer and the second layer to provide a mechanical interlock between the first layer and the second layer; and

[a third layer of] an open mesh[, wherein the third layer is] above the second layer such that the open mesh engages and interlocks with the slivers of the second layer to provide a mechanical interlock with the slivers of the second layer to maintain [the first layer and] the second layer in place[when the mat is placed on a surface].

12. The method of claim 11, wherein placing *or forming* the first mat on the surface includes placing *or forming* the first mat on the surface in which the first layer includes excelsior, the second layer includes plastic slivers, and the open mesh [of the third layer] includes synthetic material in a leno weave.

13. The method of claim 12, wherein placing *or forming* the first mat on the surface includes placing *or forming* the first mat on the surface such that the first layer is immediately adjacent and contacts the surface, the second layer is immediately adjacent, contacts, and is on top of the first layer, and the [third layer] *open mesh* is immediately adjacent, contacts, and is on top of the second layer.

14. The method of claim 13, further comprising placing a tied block mat on top of the first mat.

15. A method for forming an erosion-preventing laminate mat having a layer of a first mat beneath a substantially flat, elongate sheet of tied block mat, the method comprising:

placing the substantially flat, elongated sheet of the tied block mat on a first surface;

placing a roll of the first mat on a spindle of a frame, the frame having spaced apart rear wheels;

placing the frame on the first surface beneath a segment of the substantially flat, elongated sheet of the tied block mat, such that the segment of the sheet of the tied concrete block mat passes over and is supported by an upper surface of the frame;

moving the frame relative to and beneath the flat sheet of the tied block mat, and simultaneously paying out a sheet of the first mat from the roll of the first mat on the spindle between the spaced apart rear wheels of the frame such that the first mat is beneath the flat sheet of the tied block mat, such that the frame lifts the segment of the elongated sheet of tied block mat over the spindle as the frame moves along the strip of tied block mat;

forming a laminate of the tied block mat and the first mat into a roll; and unrolling the laminate on the first surface.

16. A method for forming an erosion-preventing mat, the method comprising:

placing a first, [lowermost] *lower* layer [consisting] of slivers of a natural material on a surface, the slivers of natural material tangled with each other to form a first felt-like mat;

placing a second layer [consisting] of slivers of a synthetic material on top of the first layer, the slivers of synthetic material tangled with each other to form a second felt-like mat;

such that the second layer [is superposed to, and] *is positioned above and* contacts the first layer such that the slivers of the first layer and the slivers of the second layer engage and intermesh with each other at an interface of the first layer and the second layer to provide a mechanical interlock between the first layer and the second layer; and placing [a third layer of] an open mesh on top of the second layer, such that the open mesh engages and interlocks with the slivers of the second layer to provide a mechanical interlock with the slivers of the second layer to maintain the [first layer and the] second layer in place when the mat is placed on a surface.

17. The method of claim 16, further comprising placing a tied block mat on top of the [third layer] *open mesh*.

18. The method of claim 17, further comprising bonding the [third layer] *open mesh* to an upper surface of the second layer.

*19. The laminate mat of claim 7, wherein the laminate mat is configured to permit replacement vegetation to grow up from a surface on which the mat is placed through the third layer.*

*20. The laminate mat of claim 19, wherein the first layer, second layer, open mesh, and third layer each contain gaps sufficient to permit replacement vegetation to grow up from a surface on which the laminate is placed through the third layer.*

*21. The laminate mat of claim 1, wherein the open mesh is a netting material.*

*22. The laminate mat of claim 1, wherein the layer of slivers of natural material contacts a surface on which the mat is placed.*

*23. The laminate mat of claim 1 wherein the slivers of the first layer and the slivers of the second layer engage and intermesh with each other at the interface in a generally planar direction.*

*24. The laminate mat of claim 1 wherein the first layer consists essentially of slivers of natural material, and wherein the second layer consists essentially of slivers of synthetic material.*

*25. The method of claim 11 wherein the first layer consists essentially of slivers of natural material, and wherein the second layer consists essentially of slivers of synthetic material.*

*26. The method of claim 11 wherein the first layer is first placed on the surface, followed by the second layer, and wherein the method further includes placing a layer of tied block mat on the first layer and the second layer.*

*27. The method of claim 16 wherein the first layer consists essentially of slivers of natural material, and wherein the second layer consists essentially of slivers of synthetic material.*

*28. An erosion-preventing laminate for promoting the growth of replacement vegetation, the laminate mat comprising:*

*a first layer comprising slivers of natural material intertwined with each other to form a first mat;*

*a second layer comprising slivers of synthetic material intertwined with each other to form a second mat; and*

*a third layer comprising a tied block mat that includes a plurality of concrete blocks interconnected by a mesh;*

*wherein the first layer is configured to be in contact with a ground surface on which the laminate is placed such that:*

*the second layer is above the first layer; and*

*the third layer is above the second layer;*

*wherein the slivers of natural material in the first layer and the slivers of synthetic material in the second layer intermesh with each other at the interface of the first and second layers to provide a mechanical interlock between the two layers; and*

*wherein the first, second, and third layers comprise sufficient gaps to permit replacement vegetation to grow up from the surface through the third layer comprising a tied block mat.*

*29. The laminate of claim 28 wherein the first layer consists essentially of slivers of natural material, and wherein the second layer consists essentially of slivers of synthetic material.*

*30. The laminate of claim 28 wherein the first layer is in contact with a ground surface on which the laminate is placed such that the second layer is above the first layer, and such that the third layer is above the second layer.*

*31. An erosion-preventing laminate mat comprising:*

*a first, lower layer comprising slivers of a natural material, the slivers of natural material tangled with each other to form a first felt-like mat;*

*a second layer comprising slivers of a synthetic material, the slivers of synthetic material tangled with each other to form a second felt-like mat, wherein the second layer is configured, when the mat is positioned on a surface, to be positioned above and contact the first layer such that the slivers of the first layer and the slivers of the second layer engage and intermesh with each other at an interface of the first layer and the second layer to provide a mechanical interlock between the first layer and the second layer; and*

*an open mesh configured, when the mat is positioned on the surface, to be positioned above the second layer such that the open mesh engages and interlocks with the slivers of the second layer to provide a mechanical interlock with the slivers of the second layer to maintain the second layer in place.*

*32. The laminate mat of claim 31 further comprising a layer of a tied block mat configured to be positioned above the first and second layers when the mat is positioned on the surface.*

*33. A method for forming an erosion-preventing mat, the method comprising:*

*placing a first, lower layer comprising slivers of a natural material on a surface, the slivers of natural material tangled with each other to form a first felt-like mat; and*

*placing on the first layer, a second layer comprising slivers of a synthetic material, wherein the slivers of synthetic material are tangled with each other to form a second felt-like mat such that the second layer is positioned above and contacts the first layer such that the slivers of the first layer and the slivers of the second layer engage and intermesh with each other at an interface of the first layer and the second layer to provide a mechanical interlock between the first layer and the second layer, wherein after the second placing step an open mesh is thereby positioned on top of the second layer, wherein the open mesh engages and interlocks with the slivers of the second layer to provide a mechanical interlock with the slivers of the second layer to maintain the second layer in place.*

*34. The method of claim 33 further wherein after the second placing step a layer of a tied block mat is positioned above the first and second layers.*

* * * * *